United States Patent [19]

Gayle

[11] Patent Number: 4,858,380
[45] Date of Patent: Aug. 22, 1989

[54] GUARD STRUCTURE FOR TOMATO PLANTS

[76] Inventor: Edwin O. Gayle, 2810 Creswell St., Shreveport, La. 71104

[21] Appl. No.: 168,230

[22] Filed: Mar. 15, 1988

[51] Int. Cl.⁴ .................... A01G 17/06; A01G 13/00; A01G 13/10
[52] U.S. Cl. ........................................ 47/45; 47/47; 47/31; 47/23
[58] Field of Search .................. 47/23, 26, 28, 31, 39, 47/44, 45, 46, 47

[56] References Cited

U.S. PATENT DOCUMENTS

| | | | |
|---|---|---|---|
| 951,807 | 3/1910 | Erdly | 47/22 |
| 1,552,445 | 9/1923 | Peres | 47/31 |
| 1,739,246 | 3/1928 | Stripling | 47/31 |
| 1,780,950 | 3/1928 | Stevason | 47/31 |
| 1,926,053 | 4/1931 | Morgan | 47/31 |
| 2,009,867 | 7/1935 | Ball | 47/44 |
| 3,088,245 | 5/1963 | Menge | 47/47 |
| 3,816,959 | 5/1974 | Nalle, Jr. | 47/31 |
| 4,395,844 | 8/2984 | Jopson | 47/31 |

Primary Examiner—Robert A. Hafer
Assistant Examiner—Lynda M. Cofsky
Attorney, Agent, or Firm—John M. Harrison

[57] ABSTRACT

A guard structure for tomato plants which is characterized by a first enclosure having a selected cross-sectional area and height and shaped from wire mesh with supporting legs extended into the ground to anchor the first enclosure in a vertically upright configuration and a second enclosure of larger cross-sectional area, also constructed of wire mesh and provided with a hinged wire mesh lid, which second enclosure is stacked on top of the first enclosure. The enclosures are designed to be placed over one or more tomato plants, such that the first, or lower enclosure protects the lower portion of the stem or vine of the plant and the second, or upper enclosure protects the upper portion of the plant, including the fruit, from birds and animals. The hinged wire mesh lid facilitates opening the second enclosure of the guard structure to retrieve the fruit as the fruit ripens within the enclosures. In a preferred embodiment of the invention, the second enclosure is cylindrical in shape and the first enclosure is tapered from a smaller diameter at the bottom to a larger diameter at the top thereof, in a funnel configuration to better facilitate access to the tomatos growing therein.

5 Claims, 2 Drawing Sheets

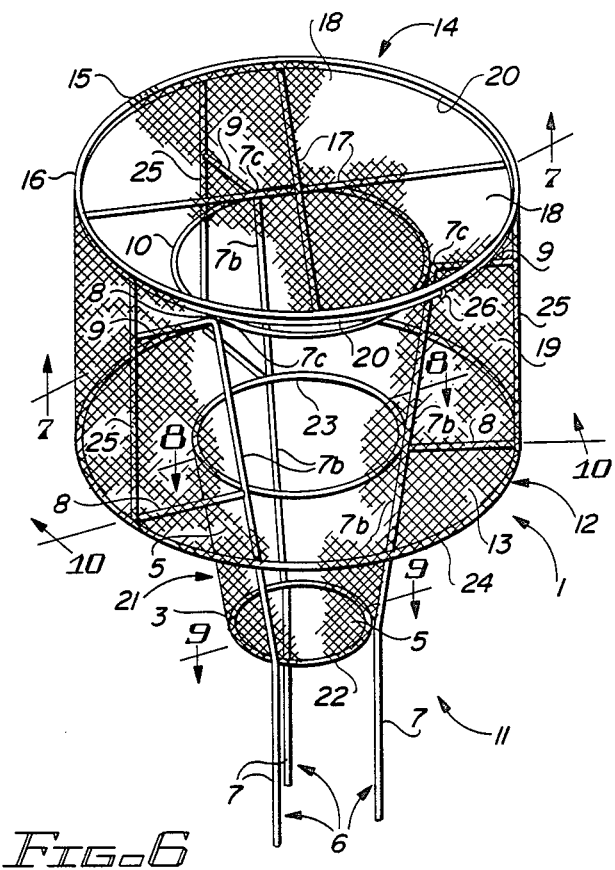
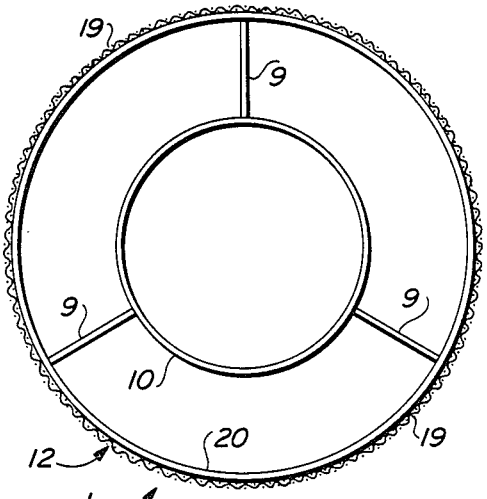
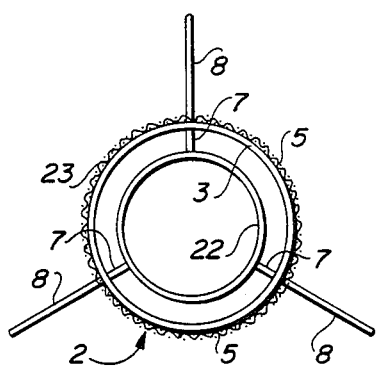
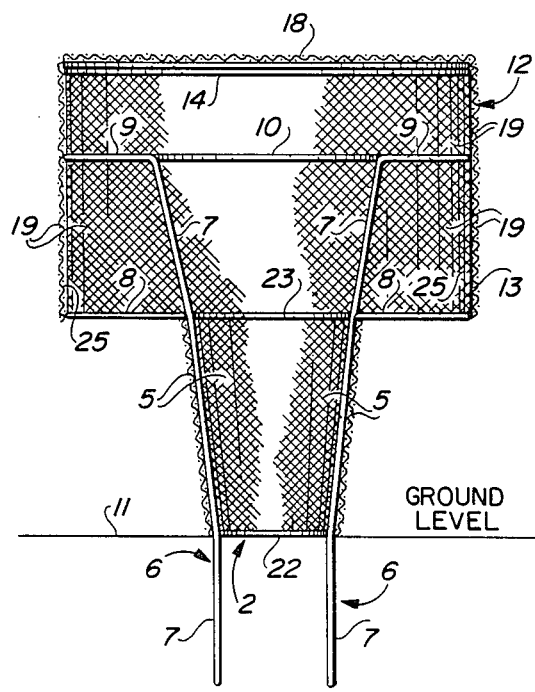
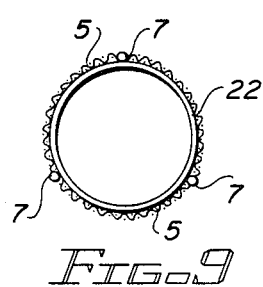

GUARD STRUCTURE FOR TOMATO PLANTS

BACKGROUND OF THE INVENTION

1. Field of the Invention

This invention relates to protective devices for fruit and vegetable plants and more particularly, to a guard structure for tomato plants which includes a pair of wire mesh enclosures of dissimilar size, the smaller enclosure being anchored to the ground and adapted to support the larger enclosure. In a preferred embodiment of the invention, the larger enclosure is a wire mesh cylinder provided with a wire mesh lid which is hingedly attached to the upper rim of the cylinder and the guard structure is designed to enclose and protect one or more tomato plants and the tomatos growing thereon, from birds, squirrels and other animals which might eat or damage the fruit. In another most preferred embodiment, the bottom enclosure is tapered like a funnel from a small bottom ring to a larger top ring and is covered with wire mesh and fitted with three spaced, wire legs which extend into the ground to support both the bottom funnel-shaped enclosure and top cylinder in an upright configuration. The opposite ends of the legs extend into the cylinder to support a still larger third ring and to maintain the cylinder on the bottom enclosure and further support the plant or plants. Access to the guard structure is provided by the hinged lid which can be opened to pick the ripe fruit growing on the plant(s).

One of the problems which has long been realized in the growing of fruits and vegetables is that of consumption and damage of the ripened fruit by birds and animal predators in the field. Tomatos are particularly susceptible to damage by birds and other animals such as squirrels, mice and the like, and many millions of dollars are lost annually in the growing of field tomatos by such predators. The problem is also vexing to the backyard gardener who normally cultivates a small number of tomato plants for home consumption and often loses much of his crop to birds who feed on or peck the ripened fruit.

2. Description of the Prior Art

Various types of plant protectors have been developed and are known in the art for a variety of protective purposes. Typical of these protective devices is the "Plant Protector" detailed in the early U.S. Pat. No. 327,510, dated Oct. 6, 1885, to G. Anderson. The device includes a perforated shell having a cover which is located within the shell under the upper end thereof and provided with a raised lip and an eyelet for hinging the cover to the shell Another plant protector is detailed is U.S. Pat. No. 1,552,445, dated Sept. 8, 1925, to M. Peres. The device is characterized by a perforated body positioned over a plant to be protected and equipped with a separate cover which is removable from contact with the body. Rods carried by the body serve to anchor the body to the ground and the upper ends of the rods impinge against the top of the cover. U.S. Pat. No. 1,739,426, dated Dec. 10, 1929, to J. A. Stripling, further describes a "Plant Protector". This plant protector device includes an open-ended cylinder adapted to be anchored in the ground around a plant to enclose the plant and a perforated body open at the lower end and closed at the upper end, with the lower open end of the perforated body encircling the upper portion of the cylinder. A band extends around the lower edge of the perforated body and is secured to the adjacent portion of the cylinder and offset brackets are secured to the upper portion of the cylinder for limiting the insertion of the cylinder in the ground. Another plant protector is detailed in U.S. Pat. No. 1,780,950, dated Nov. 11, 1930, to J. Stevason. The device is characterized by a metal strap having a corrugation intermediate the side edges thereof and arranged with the lower side edge of the strap adapted for earth penetration, a hood including a dome-like fabric portion and a hood support having a fabric-supporting rim and arms supported thereby and projecting upwardly for sustaining the hood in dome formation. The device is designed to protect a plant which is located beneath the dome. U.S. Pat. No. 1,926,053, dated Sept. 12, 1933, to O. B. Morgan, covers another "Plant Protector". The device includes a wire mesh, dome-shaped housing for enclosing a plant and a wire mesh base flange extending outwardly of and downwardly from the housing in a substantially square configuration, whereby the corners of the flange provide cutting, pointed projections for penetrating the earth surrounding the plant, in order to frustrate burrowing rodents. A "Trellis and Plant Protector" is detailed in U.S. Pat. No. 2,009,867, dated July 30, 1935, to F. J. Ball. The device is characterized by a plurality of vertically-spaced, closed, hollow elements with peripherally-spaced wires connecting and spacing the elements, the wires extended to provide supporting means adapted to enter the ground and operatively position the trellis over a plant. A light-diffusing covering for both the sides and the top of the trellis is provided, in order to protect the plants from direct sun rays. An aperture is also provided in the top covering of the trellis to facilitate entry of rainwater. U.S. Pat. No. 3,816,959, dated June 18, 1974, to George S. Nalle, Jr., details a "Plastic Guard for Protecting Young Trees, Plants and Flowers". The guard includes a one-piece, extruded length of tubular mesh formed by intersecting thermoplastic filaments. The tubular mesh is bonded to an elongated, thermoplastic, extruded stake for anchoring the tubular mesh to the ground. The tubular mesh surrounds the plant to be protected, while the stake portion of the structure holds the tubular mesh in the desired position U.S. Pat. No. 4,395,844, dated Aug. 2, 1983, to Tom Jopson, includes a "Device to Support Flexible Netting Used to Protect Plants from Damage by Animals and Adverse Environmental Conditions". The protective device detailed in this patent is designed to support a flexible netting for protecting plants, especially seedlings, from browsing wildlife such as deer. The device includes a metal or plastic wicket having two legs which are inserted in the ground and shaped to define a space, within which space the plant is shielded by the netting when the netting is disposed around and supported by the wicket. A copy of the above described patents is provided herein.

It is an object of this invention to provide a new and improved guard structure for tomato plants, which guard structure is characterized by a first ground-supported, mesh-covered enclosure having a selected cross-sectional area and a second enclosure of larger cross-sectional area, also covered with mesh and supported by the bottom enclosure, which enclosures receive one or more tomato plants and protect the plant(s) and the ripened fruit from birds and other animals.

Another object of the invention is to provide a guard structure for enclosing tomato plants, which guard structure includes a pair of cylinders having mesh sides and dissimilar diameters, the smaller cylinder being ground supported and designed to support the larger cylinder, wherein one or more tomato plants are enclosed within the two cylinders, and further including a hinged top provided on the top cylinder for gaining access to the interior of the cylinders and picking the tomatos.

A still further object of the invention is to provide a guard structure for tomato plants which is characterized by a pair of wire mesh cylinders, the first cylinder of which is tapered from a small to a larger diameter, is ground-supported and supports a larger top cylinder, wherein a tomato plant is surrounded by and enclosed within the two cylinders and the ripening tomatos are protected by the wire mesh from consumption by birds and animals.

Yet another object of this invention is to provide a new and improved guard structure for one or more tomato plants which includes a pair of cylindrical enclosures having the sides thereof covered with wire mesh, the first of which enclosures is tapered from a small diameter at the bottom to a larger diameter at the top and is smaller than the second, which first enclosure is supported by spaced legs projecting into the ground, the legs extending from the ground upwardly to support the larger top enclosure, and further including a hinged wire mesh lid attached to the top rim of the top enclosure, for providing access to and harvesting the ripe fruit on the tomato plant(s).

Yet another object of this invention is to provide a new and improved enclosure and guard for protecting tomatos and tomato plants from injury and damage due to predators such as birds, which guard includes a tapered, funnel-shaped bottom enclosure having a wire or plastic mesh side, three legs supporting the bottom enclosure and extending upwardly in spaced relationship to a ring having a diameter which is larger than the largest diameter of the bottom enclosure, the legs further terminating in outwardly-extending supports which support a larger enclosure frame of selected shape and also covered with a wire or plastic mesh.

SUMMARY OF THE INVENTION

These and other objects of the invention are provided in a new and improved guard structure for enclosing and protecting one or more tomato plants, which guard structure includes, in a first preferred embodiment, a first open-ended cylinder having wire or plastic mesh sides and fitted with a plurality of wire legs extending into the ground, in order to support the cylinder in upright, vertical configuration; a second open-ended cylinder mounted on top of the first cylinder and also having wire or plastic mesh sides and a larger diameter than the first cylinder, wherein the supporting legs extend from the small cylinder into the large wire mesh cylinder; and further including a mesh-covered lid hinged to the top rim of the large cylinder, in order to facilitate access to both cylinders in picking of the fruit on a tomato plant or plants growing inside the cylinders. In a second preferred embodiment of the invention, the smaller first cylinder is tapered from a small bottom ring to a larger top ring to define a cone, while the second, larger cylinder is uniform in diameter.

BRIEF DESCRIPTION OF THE DRAWING

The invention will be better understood by reference to the accompanying drawings, wherein:

FIG. 6 is a perspective view of a second preferred embodiment of the guard structure for tomato plants of this invention;

FIG. 7 is a sectional view taken along line 7—7 of the guard structure illustrated in FIG. 6;

FIG. 8 is a sectional view taken along line 8—8 of the guard structure illustrated in FIG. 6;

FIG. 9 is a sectional view taken along line 9—9 of the guard structure illustrated in FIG. 6; and FIG. 10 is a sectional view taken along line 10—10 of the guard structure illustrated in FIG. 6.

DESCRIPTION OF THE PREFERRED EMBODIMENTS

Figure 1:
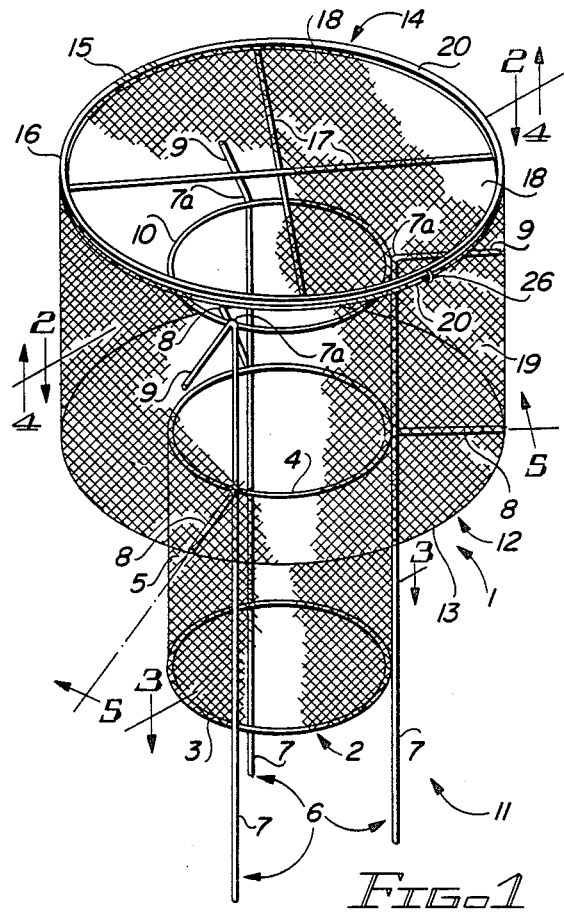
FIG. 1 is a perspective view of a first preferred embodiment of the guard structure for tomato plants of this invention.
Figure 2:
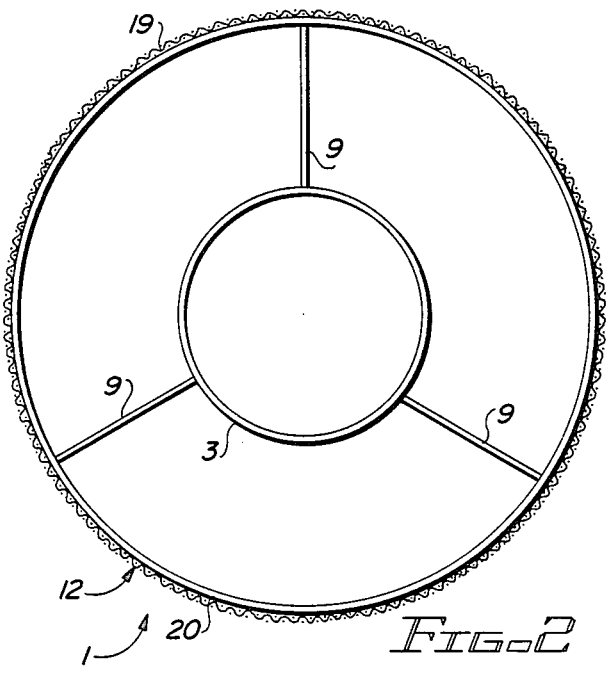
FIG. 2 is a sectional view taken along line 2—2 of the guard structure illustrated in FIG. 1.
Figure 3:
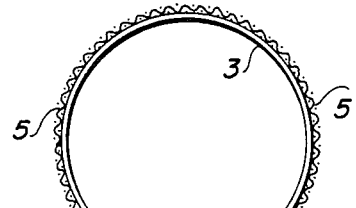
FIG. 3 is a sectional view taken along line 3—3 of the guard structure illustrated in FIG. 1.

Referring initially to FIGS. 1–5 of the drawings, in a first preferred embodiment of the invention, the guard structure for tomato plants of this invention is generally illustrated by reference numeral 1. The guard structure 1 is characterized by a bottom cylinder 2 of selected diameter and height and provided with a bottom cylinder base ring 3 and a bottom cylinder top ring 4, spaced from the bottom cylinder base ring 3. The bottom cylinder base ring 3 and the bottom cylinder top ring 4 are secured in the illustrated position by attachment to the vertical segments 7 of three spaced support legs 6, respectively, the bottom ends of which vertical segments 7 are projected into the ground 11, in order to stabilize the bottom cylinder 2 in upward-standing, vertical configuration, as illustrated. A bottom cylinder mesh 5 extends completely around the circumference of the bottom cylinder base ring 3 and the bottom cylinder top ring 4, as further illustrated in FIG. 1. Accordingly, it will be appreciated that the bottom cylinder 2 includes a bottom cylinder mesh 5 which extends 360 degrees to define the side of the bottom cylinder 2, with the bottom end of the bottom cylinder 2 open at the bottom cylinder base ring 3 and the top end of the bottom cylinder 2 open at the bottom cylinder top ring 4.

Figure 5:
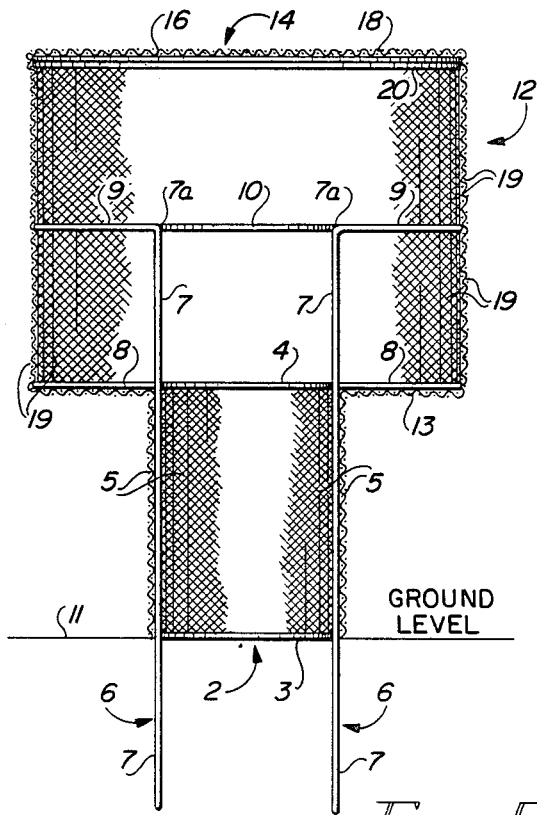
FIG. 5 is a sectional view taken along line 5—5 of the guard structure illustrated in FIG. 1.
Figure 4:
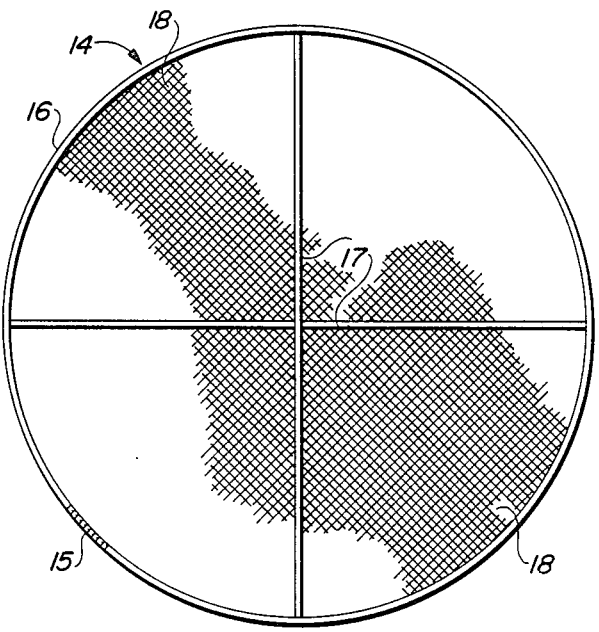
FIG. 4 is a top view of a preferred lid for closing the top of the guard structure illustrated in FIG. 1.

In a preferred embodiment of the invention and referring to FIGS. 1, 4 and 5 of the drawing, each of the vertical segments 7 of the support legs 6 extend upwardly to a vertical segment bend 7a, respectively, and project outwardly in 90 degree relationship, in order to define the three top horizontal supports 9. An extension ring 10 is welded or otherwise attached to the vertical segments 7 of the respective support legs 6 at each vertical segment bend 7a, as further illustrated in FIG. 1. In yet another preferred embodiment of the invention, a bottom horizontal support 8 extends from welded attachment to each of the vertical segments 7 of the support leg 6 beneath and parallel to the top horizontal supports 9. A top cylinder 12, having a diameter which is larger than the diameter of the bottom cylinder 2, is positioned on top of the bottom cylinder 2, with a top cylinder base 13 formed of mesh and resting on the bottom horizontal supports 8 which extend outwardly from the vertical segments 7 of the support leg 6, respectively. The top rim of the top cylinder 12 is defined by a top cylinder ring 20 and a length of top cylinder mesh 19 covers the entire outer surface of the top cylinder 12, as illustrated. A round lid 14 is provided with lid mesh 18 which is seated on a pair of cross braces 17 that extend across a diameter of the lid 14 and are attached to a lid perimeter ring 16, as illustrated in FIGS. 1 and 4. A hinge 15 is secured to the lid perimeter ring 16 of the lid 14 and to the top cylinder ring 20 of the top cylinder 12, in order to facilitate opening and closing of the lid 14 to provide access to the interior of the guard structure 1. A wire lid retainer 26 is attached to the lid perimeter ring 16 of the lid 14, for bending through the mesh openings in the top cylinder mesh 19 and retaining the lid 14 in closed configuration. A tomato plant (not illustrated) planted in the ground 11 inside the guard structure 1, grows upwardly through the bottom cylinder 2 and into the top cylinder 12, where the plant bushes outwardly as well as upwardly, such that the tomatos are primarily located inside the top cylinder 12. Accordingly, referring again to FIGS. 1 and 5 of the drawing, while the first cluster or clusters of tomatos may be located inside the bottom cylinder 2, most of the fruit will accumulate on the tomato plant vine inside the top cylinder 12 and can be easily reached and picked by raising the lid 14 on the hinge 15 and reaching into the top cylinder 12. Furthermore, when the plant is young, the first tomatos to ripen will be those located in the first clusters of the plant located in the bottom cylinder 2 and can also be easily reached therein.

Referring now to FIGS. 6–10 of the drawings, in a second preferred embodiment of the invention the guard structure 1 is characterized by a tapered, funnel-shaped bottom enclosure 21, which is defined by a small bottom enclosure base ring 22 and a large bottom enclosure base ring 23, connected by the bottom enclosure mesh 5. The bottom enclosure 21 is supported in vertical, upright orientation by three support legs 6, which bend at the small bottom enclosure base ring 22 and extend upwardly to define extended leg segments 7b and downwardly at one end to penetrate the ground 11. The extended leg segments 7b of the support legs 6 extend upwardly from the bend along the side of the bottom enclosure 21 in spaced relationship, to an extension ring 10, which is positioned above, and is larger in diameter than, the large bottom enclosure base ring 23. The extended leg segments 7b then project outwardly from the extension ring 10 at the respective extended leg segment bends 7c to define the top horizontal supports 9, which are welded or otherwise attached to three spaced, vertically-oriented enclosure stiffeners 25, that extend between and support the horizontally-oriented top cylinder base ring 24 and top cylinder ring 20. In a most preferred embodiment of the invention, the top cylinder base ring 24 and top cylinder ring 20 are equal in diameter and are larger in diameter than the extension ring 10. Three horizontally-oriented bottom horizontal supports 8 connect the large bottom enclosure base ring 23 to the top cylinder base ring 24 in spaced relationship, as illustrated in FIG. 6. The top cylinder mesh 19 covers the side of the top cylinder 12 between the top cylinder ring 20 and the top cylinder base ring 24. As further illustrated in FIGS. 4 and 6, a lid 14, shaped by a round lid perimeter ring 16, can be secured to the top cylinder ring 20 by means of a hinge 15, to close the top cylinder 12, as heretofore described with respect to the guard structure 1 illustrated in FIGS. 1–5. A pair of cross-braces 17 extend across spaced diameters of the lid perimeter ring 16 to brace and support the lid 14 and a wire lid retainer 26 may be provided on the lid perimeter ring 16, to engage the top cylinder mesh 19 and secure the lid 14 on the top cylinder ring 20.

Referring again to FIGS. 1–5 of the drawings, it will be appreciated that the support legs 6 can be attached to the bottom cylinder base ring 3, bottom cylinder top ring 4 and the extension ring 10 by welding, soldering or gluing techniques, in non-exclusive particular, according to the knowledge of those skilled in the art. Likewise, as illustrated in FIGS. 6–10, the extended leg segments 7b of the support legs 6 can be so attached to the small bottom enclosure base ring 22, large bottom enclosure base ring 23, extension ring 10 and enclosure stiffeners 25. The top horizontal supports 9 and bottom horizontal supports 8 can be likewise secured to the respective extension leg segments 7b and to the enclosure stiffeners 25, as desired, and the cross-braces 17 may also be welded, soldered, glued or otherwise securely attached to the lid perimeter ring 16, as desired.

It will be appreciated by those skilled in the art, that in both embodiments of the invention, the guard structure for tomato plants detailed in this patent application provides a convenient and efficient means for protecting tomatos from predators and birds in particular, while the fruit is ripening. Further- more, referring again to the drawings, the guard structure 1 is constructed to facilitate easy collection of the fruit, since most of the tomatos will be located on the plant inside the large top cylinder 12 and are easily accessible by lifting the lid 14 on the hinge 15. It will be further appreciated by those skilled in the art that the size and material of construction of the lid mesh 18, top cylinder mesh 19 and the bottom cylinder mesh 5 can be varied, depending upon the size of the birds and other predators which are indigenous to the area where the tomato plants are grown. In a typical design, wire "hardware cloth" having a mesh size of about one-half inch is suitable for structuring the mesh covering both the bottom cylinder 2, the tapered bottom enclosure 21 and the top cylinder 12, as well as the lid 14 of the guard structure 1. However, it will be appreciated by those skilled in the art that both galvanized, painted or coated metal and plastic materials can be used to construct the support legs 6, top horizontal supports 9, bottom horizontal supports 8, enclosure stiffeners 25 and cross-braces 17, as well as the lid mesh 18, top cylinder mesh 19 and the bottom cylinder mesh 5 of the lid 14, top cylinder 12, bottom cylinder 2 and tapered bottom enclosure 21, respectively, as desired.

It will be further appreciated that while the guard structure 1 is preferably shaped as illustrated in FIGS. 1–5 and 6–10, respectively, enclosures of substantially any shape, such as rectangular, and the like, can also be used, as desired, so long as the enclosures are of different size, in order to accommodate the expanding size of the enclosed tomato plant or plants.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A guard structure for enclosing and protecting at least one tomato plant, comprising a plurality of leg means disposed in spaced relationship, with one end of each of said leg means engaging the ground; a first ring having a first selected diameter attached to said leg means in substantially horizontal relationship; a second ring having a second selected diameter attached to said leg means in substantially horizontal relationship and spaced from said first ring; a first quantity of mesh extending around the circumference of said first ring and said second ring for connecting said first ring to said second ring; a generally cylindrically-shaped enclosure frame carried by said leg means above said second ring, said enclosure frame having diameter greater than the diameter of said first ring and said second ring, respectively; substantially horizontally-oriented bottom supports fixedly carried by said leg means in substantially perpendicular relationship, said bottom support supporting said bottom of said enclosure frame; a second quantity of mesh substantially covering the sides and bottom of said enclosure frame and a bottom opening provided in said mesh, said bottom opening provide substantially coextensive with said second ring, and said enclosure frame op at the top thereof; and lid means carried by said enclosure frame and selectively covering said top, for providing access to the tomato plant located inside said guard structure.

2. The guard structure of claim 1 wherein said lid means further comprises a lid ring having a diameter substantially equal to the diameter of said enclosure frame and a third quantity of mesh covering said diameter of said lid ring.

3. The guard structure of claim 1 wherein said lid means further comprises a lid ring having a diameter substantially equal to the diameter of said enclosure frame and a third quantity of mesh covering said diameter of said lid ring and further comprising
a third ring having a third selected diameter and attached to said leg means in substantially horizontal, spaced relationship with respect to said second ring.

4. The guard structure of claim 3 wherein said first selected diameter of said first ring and said second selected diameter of said second ring are substantially equal.

5. The guard structure of claim 3 wherein said third selected diameter of said third ring is larger than said second selected diameter of said second ring and said second selected diameter of said second ring is larger than said first selected diameter of said first ring.

* * * * *